Dec. 30, 1969  R. A. STONE ET AL  3,486,832
HELICOPTER ROTOR TRANSMISSION SYSTEM

Filed June 25, 1968  2 Sheets-Sheet 1

INVENTORS
ROBERT A. STONE
BRIAN L. CARNELL
By Vernon F. Hauschild
ATTORNEY

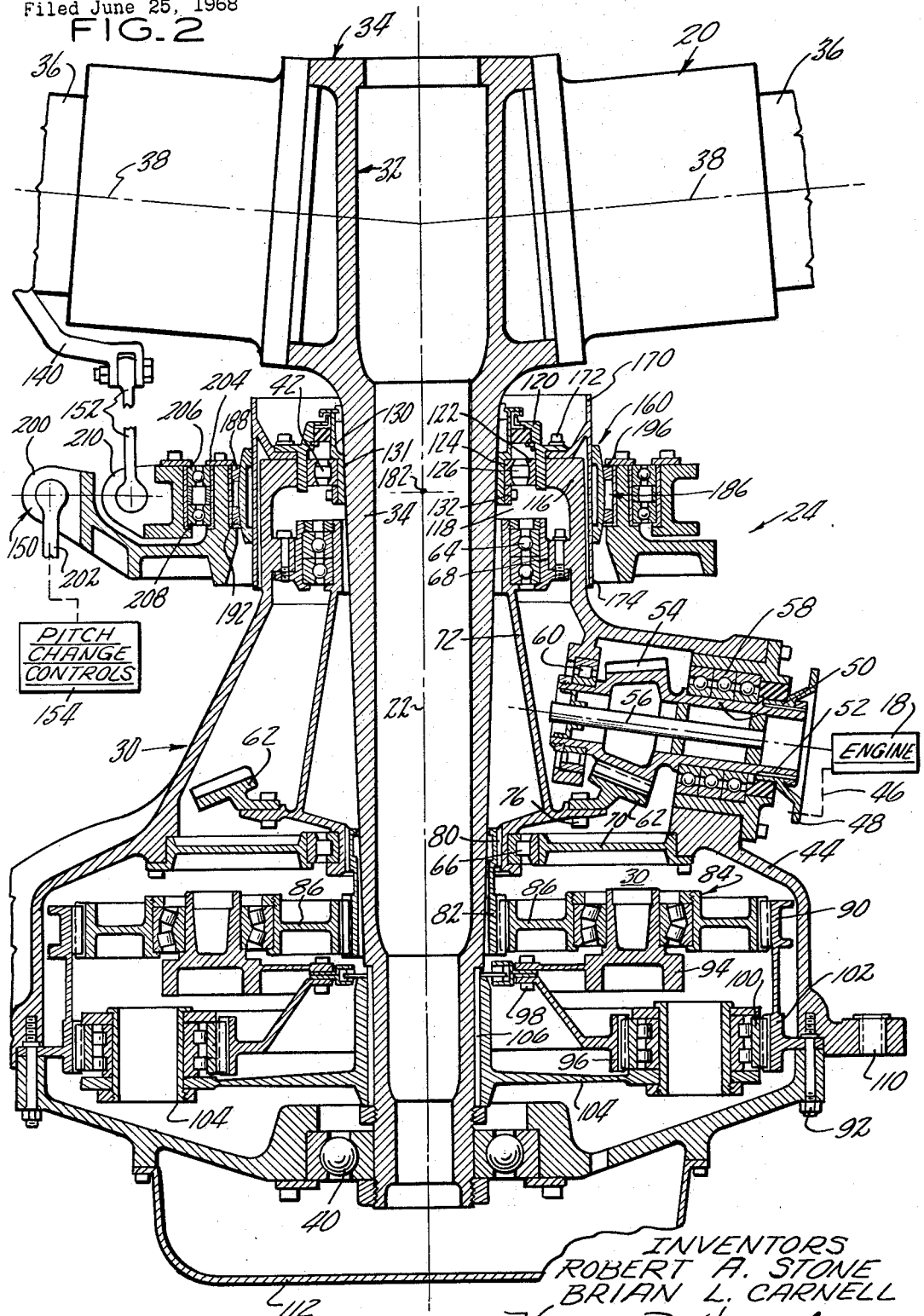

United States Patent Office 3,486,832
Patented Dec. 30, 1969

3,486,832
HELICOPTER ROTOR TRANSMISSION SYSTEM
Robert A. Stone, Stratford, and Brian L. Carnell, Milford, Conn., assignors to United Aircraft Corporation, East Hartford, Conn., a corporation of Delaware
Filed June 25, 1968, Ser. No. 739,711
Int. Cl. B63h 3/10
U.S. Cl. 416—114                                              12 Claims

ABSTRACT OF THE DISCLOSURE

A helicopter rotor transmission system wherein the transmission housing sleeve envelops the rotor drive shaft and supports the drive shaft through a self-aligning bearing which is connected to the shaft through a retainer ring bonded to the shaft and wherein the swash plate envelopes the sleeve and bearing to reduce the height of the rotor without increasing the radial dimension thereof and wherein the swash plate is connected to the sleeve through a spring loaded spherical bearing.

---

The invention herein described was made in the course of or under a contract or subcontract thereunder with the Department of the Air Force.

BACKGROUND OF THE INVENTION

Field of invention

This invention relates to helicopter transmission systems and more particularly to systems for driving the helicopter rotor and changing the pitch of the blades thereof both cyclically and collectively. This invention accomplishes these functions while reducing the height of the combined rotor and transmission without increasing the width of the rotor or its transmission system.

Description of the prior art

In the helicopter transmission art, it has been conventional to support the swash plate from a standpipe mechanism which projects vertically upward from the transmission housing and to join the swash plate mechanism to the spherical bearing through a web system of substantial radial dimension with respect to the rotor axis of rotation. A good example of this is shown in Tresch Patent No. 3,322,200 and it will be noted that this conventional construction produces a helicopter rotor system of substantial height. This build-up in rotor height is believed to be brought about because the various rotor components were individually designed, then assembled in stacked fashion, rather than being designed as parts of an integral coacting system.

By viewing the Tresch patent it will be seen that the aforementioned web system performs no function other than to connect the swash plate to the spherical bearing.

In addition, helicopter rotor drive shafts have traditionally been made of steel, and shaft deflection has presented no particular problem and ordinary antifriction bearings were sufficient to support the shaft against deflection and shaft machining presented no particular problem. With the advent of high strength-to-weight ratio materials such as titanium, however, shaft deflection does present a problem, which problem increases with the length of the rotor drive shaft within the gear box, and shaft machining problems are also encountered.

The weight saving which could be expected to be attained by using a titanium shaft because of its favorable strength-to-weight ratio, had to be sacrificed by thickening the drive shaft to minimize shaft deflection. Since the allowable shaft deflection is restricted by the allowable slop under the support bearing, a self-aligning bearing is substituted for the conventional roller bearing to permit more efficient use of the new high strength-to-weight ratio materials.

In the prior art, the swash plate spherical bearing has been restricted to relatively small diameters to minimize bearing slop or play due to wear and/or tolerance, build up. It is an important feature of this invention that the size of the swash plate spherical bearing need not be so restricted in diameter in that the bearing outer race in our construction is split and spring loaded to maintain a constant fit between the outer and inner race of the spherical bearing.

SUMMARY OF INVENTION

A primary object of the present invention is to provide an improved helicopter rotor transmission system which is of diminished height without an increase in width.

In accordance with the present invention, the helicopter drive shaft is made of a modern high strength-to-weight ratio material, such as titanium, and is supported by a self-aligning bearing which is capable of supporting it with required deflection. In accordance with a further aspect of this present invention, this self-aligning bearing is connected to the shaft through a selectively contoured retainer ring which is bonded to the shaft thereby relieving machining problems in connection with shaft manufacture and also avoiding stress concentrations which would otherwise be caused by local depressions, screw threads or through holes in connecting the retainer ring to the shaft, as well as avoiding fretting corrosion between the bearing and the shaft.

In accordance with a still further aspect of the present invention, the spherical bearing which supports the swash plate for both axial and angular motion with respect to the rotor drive shaft includes split bearing ring members which are spring loaded to take up any wear or tolerance build up in the spherical bearing.

In this invention, a sleeve from the transmission housing envelopes and supports the rotor drive shaft through a self-aligning bearing and the swash plate envelopes this sleeve member and is supported therefrom by a spherical bearing.

Other objects and advantages will be apparent from the specification and claims and from the accompanying drawings which illustrate an embodiment of the invention.

BRIEF DESCRIPTION OF THE DRAWINGS

FIG. 2 is a cross sectional showing of our improved helicopter rotor transmission system.

DESCRIPTION OF THE PREFERRED EMBODIMENT

Figure 1:
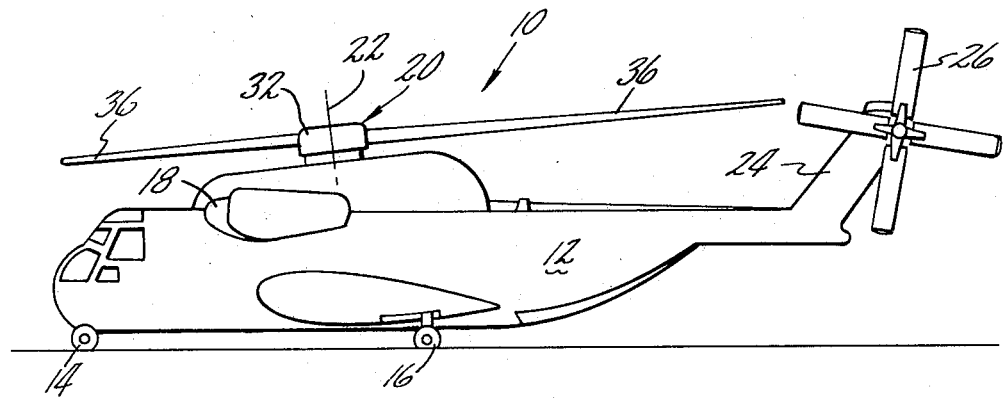
FIG. 1 is a showing of a modern helicopter utilizing our invention.
Figure 3:
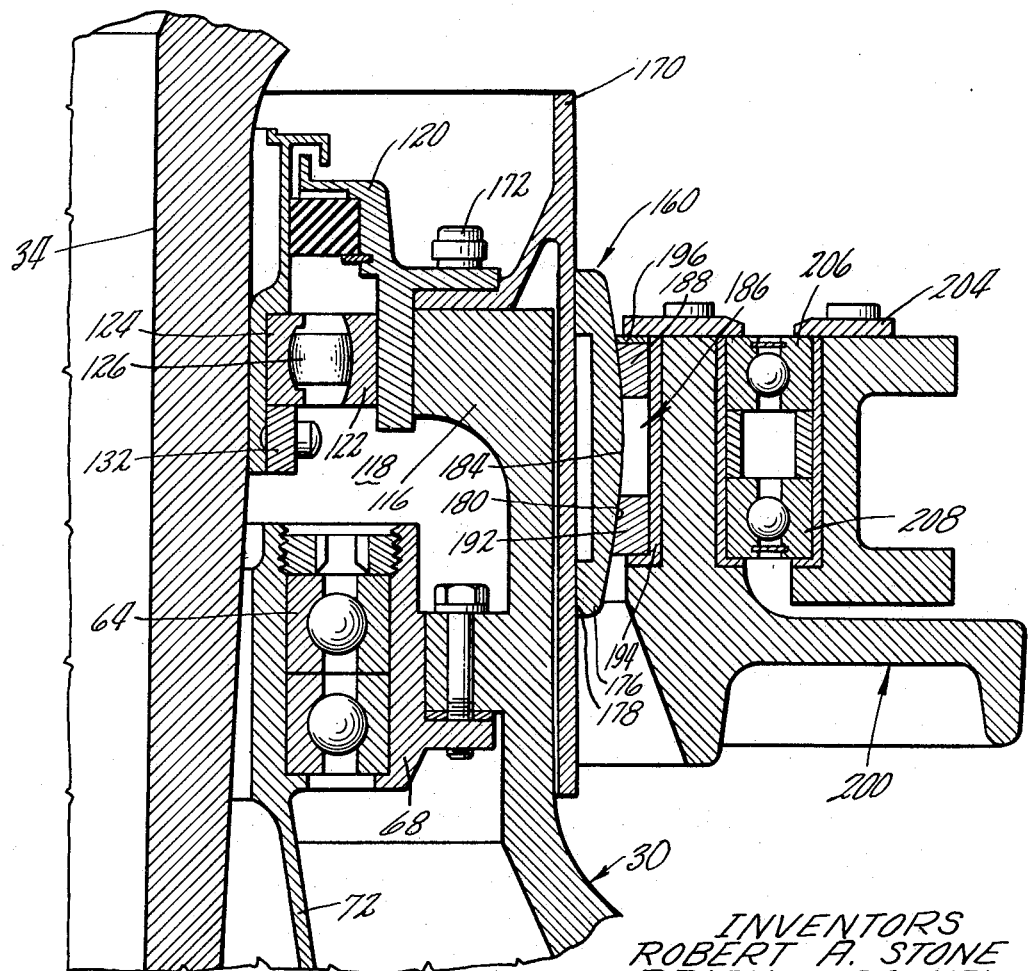
FIG. 3 is an enlarged showing of a portion of the construction shown in FIG. 2.

Referring to FIG. 1 we see helicopter 10 which includes fuselage 12 supported from the ground by landing gear 14 and 16. One or more engines 18 drive helicopter rotor 20 which is supported for rotation about axis 22 by rotor mast 34 (see FIG. 3) which projects from fuselage 12.

Referring to FIG. 2 we see the improved helicopter rotor transmission system in greater particularity. It will be noted that rotor 20 and transmission and support system 30 are concentric about rotor axis of rotation 22. Rotor 20 comprises hub 32 which is connected in any convenient way or may be integral with rotor drive shaft or mast 34 to rotate therewith concentrically about axis 22. A plurality of rotor blades 36 project radially from hub 32 and are supported therefrom for rotation therewith about axis 22 and are further supported through stack bearings (not shown) for pitch change rotation with respect to hub 32 about feathering axis 38. The construction of rotor 20 may be of the type shown in greater particularity in U.S. Patents Nos. 3,097,701 and 2,818,123.

Rotor drive shaft 34 is supported for rotation about axis 22 by thrust bearing 40 and self-aligning upper bearing 42, both of which are supported concentrically about axis 22 by transmission housing 44. As explained in greater particularity hereinafter, bearing 40 takes all of the thrust load of the rotor 20 longitudinally along axis 22 while self-aligning bearing 42 absorbs only loads which are radial with respect to axis 22.

Transmission assembly 30 drives drive shaft 34 utilizing power delivered from engine 18, which may be either of the conventional jet or piston type, and which is connected through conventional drive shafting 46 to input shaft coupling 48, which is connected to input drive shaft 50 by splines 52 so as to drive spiral bevel input gear 54 about axis 56. Input gear 54 is an integral part of input shaft 50 and both are supported from transmission housing 44 by bearings 58 and 60. Input drive gear 54 mates with and drives spiral bevel gear 62, which is supported concentrically for rotation about axis 22 by bearings 64 and 66 which are, in turn, supported from transmission housing 44 by bearing support members 68 and 70. Bearings 64 and 66 support bevel gear support shaft or section 72, which may be integral with gear 62 or attached thereto through bolt mechanism 76. Bevel gear support shaft 72 is splined at 80 to the first stage sun gear 82 of two stage planetary reduction gear system 84. Sun gear 82 drives first stage planetary pinion gears 86, which are shown to be five in number, which in turn mate with first stage fixed ring gear 90, which is supported from transmission housing 44 by bolt mechanism 92. The coaction of fixed ring gear 90 and first stage pinions 86 cause the first stage cage 94 to drive the second stage sun gear 96, to which it is connected by bolt members 98. Second stage sun gear 96 mates with and drives second stage planetary pinion gears 100, which are shown to be thirteen in number. Second stage pinion gears 100 mate with fixed second stage ring gear 102, which is also supported from transmission housing 44 by bolt mechanisms 92, so that the coaction of ring gear 102 and pinions 100 cause the rotation of second stage pinion cage 104, which is connected in drive relation with rotor drive shaft 34 through spline connection 106. In conventional planetary gear fashion, two stage planetary gear system 84 drives rotor drive shaft 34 and helicopter rotor 20 from engine 18, which rotates at power turbine r.p.m., for example 10,000 r.p.m., and reduces the speed of the drive so that rotor 20 is being rotated at a desired r.p.m., for example 200.

Transmission housing 44 is supported from helicopter fuselage 12 by bolt system 110 and carries lubricating oil sump 112 which collects the lubricating oil being furnished to the various gears and bearings of planetary system 84.

It will be noted that transmission housing 44 includes sleeve member 116 at its upper end, which sleeve member is substantially cylindrical and concentric about drive shaft 34 to form annular chamber 118 therebetween. Bearings 64 of bevel gear support shaft 72 are located in annular chamber 118, as is self-aligning bearing 42, which is supported by bearing supports 120, which is in turn supported from sleeve section 116 of transmission housing 44.

Helicopter drive shafts have conventionally been made of steel, and while a titanium drive shaft would provide some advantages, it would also provide some disadvantages as will now be discussed.

Generally speaking, for a given environment, shaft material selection is based on several considerations; but there are three of primary interest, namely, weight, stress, and deflection. Accordingly, listed below for both titanium and steel are those physical properties and their respective values which provide some measure of these major considerations.

Thus, ignoring units for simplicity, these values are:

|  | Titanium | Steel |
| --- | --- | --- |
| Density | .162 | .283 |
| Allowable fatigue stress | $20 \times 10^3$ | $20 \times 10^3$ |
| Modulus of elasticity | $16 \times 10^6$ | $30 \times 10^6$ |

For the case of simple bending, the stress distribution for any section is defined by the expression:

(1) $$f = Mc/I$$

where:

$f$ = stress
$M$ = applied moment
$c$ = distance from the neutral axis
$I$ = moment of inertia and deflection by the generalized expression:

(2) $$S = K/EI$$

where:

$S$ = deflection
$K$ = constant defined by loading and restraints
$E$ = modulus of elasticity
$I$ = moment of inertia Considering stress first and referring to expression (1) above, it is noted that stress is a function of the applied loads in combination with purely geometric considerations and involves no physical property of the material. Referring now to the tabulated values above, it is further noted that the allowable stresses for both titanium and steel in a fatigue environment are identical. It follows that a given cross-section suitable for steel will be likewise suitable for titanium. Considering their relative densities, it therefore becomes apparent that as far as stress is concerned, titanium offers a distinct advantage over steel in that for an identical section the weight of titanium is only about half that of steel.

On the other hand, considering deflection and referring to expression (2), it is noted that deflection is a function not only of geometry, physical arrangement and loading, but involves a physical property, namely, the modulus of elasticity as well. Referring again to the tabulated values above, it is noted that the modulus of elasticity of steel is almost twice that of titanium. Thus, a section of titanium identical with another section of steel will deflect nearly twice as much under the same load conditions. Since the allowable deflection for a rotorhead shaft is dictated by the deflection that can be accommodated by its supporting bearings, a section of titanium identical with a section of steel is not suitable with conventional non-aligning bearings but must be "beefed up" or enlarged, not out of stress but due purely to deflection considerations. Therefore, the marked weight benefits to be gained from using titanium instead of steel will be minimized or even eliminated entirely unless the allowable deflection is somehow extended.

Since the maximum slope deflection with respect to axis of rotation 22, which can be tolerated in a helicopter rotor shaft with a roller bearing support is normally about .0005 inch per inch of shaft, it is an important teaching of our invention that drive shaft 34 be supported by bearing 42 so as to maintain it within the maximum deflection limits. Before the advent of titanium rotor drive shafts, a conventional roller bearing could be used as the upper radial support bearing for the shaft since the slope deflection which it had to be able to tolerate was within its capabilities. With a titanium shaft, however, this slope deflection is going to be greater as decribed above and therefore conventional bearings are unable to accept the deflection other than through the creation of highly concentrated and uneven loads therein, since the shaft slope deflection will exceed the allowable slope deflection of the upper shaft bearing. For this reason, bearing 42 is of the self-aligning type wherein outer race 122 has a spherical inner surface, rollers 126 are barrel-shaped to present contact surfaces which are of equal spherical contour with the mating surface it engages in races 122 and inner race 124 has a matching curved outer surface so that despite misalignment of shaft 34, the load distribution across the self-aligned bearing 42 is uniform, thereby avoiding the stress concentration which would be created in a conventional bearing.

Bearing 42 supports shaft 34 through retainer ring or sleeve 130 which is bonded to the exterior of shaft 34 by a bonding material 131 such as FM1000 structural adhesive per SS8669. Bearing retainer ring 130 is contoured to receive the inner race 124 of bearing 42 and coacts with retainer ring member 132, which is attached thereto, to retain the inner race 124 of bearing 42 in fixed position with respect to shaft 34 along axis 22. Bonded retainer ring 130 is used herein in preference to the conventional bearing retaining shoulder which is normally machined into the rotor shaft. The bonded sleeve eliminates the local stress concentration which would be caused by the machining of the shoulder, by local depressions, screw threads and through holes which might be associated with a non-bonded shoulder or sleeve and thereby permits a reduction in the thickness of the wall of drive shaft 34. In addition, and most importantly, the bonding of sleeve 130 to shaft 34 precludes fretting corrosion between the shaft and bearing 42 with the attendant reduction of fatigue strength of the shaft.

To permit pitch change of the blades 36 about feathering axis 38, pitch horns such as 140 project from each blade 36 and are connected to swash plate mechanism 150 through connecting links 152 so that swash plate motion caused by pitch change controls 154 will cause blades 36 to feather about feathering axis 38 either collectively or cyclically. Pitch controls 154 may be of the type shown in U.S. Patent No. 3,199,601.

Swash plate mechanism 150 is supported from transmission housing sleeve 116 through spherical ring bearing assembly 160. These swash plate spherical bearings have traditionally been restricted to a relatively small diameter and conventionally immediately envelop drive shaft 34, as shown in U.S. Patent No. 3,322,200, so as to minimize the bearing play due to wear and/or tolerance build-up. It is an important teaching of this invention that spherical bearing 160 be permitted to be of larger size by providing means to eliminate the aforementioned play therein. By avoiding excessive spherical bearing play or slop as taught herein, the diameter of the spherical bearing member 160 can be increased above the conventional spherical bearing and it will be noted that as best shown in FIG. 2, spherical bearing 160 is mounted radially outboard of sleeve section 116 of transmission housing 44. Cylindrical standpipe 170 is supported from sleeve member 116 by bolts 172. Spherical bearing 160 is seated on sleeve 170 which permits swash plate mechanism 150 to be moved longitudinally along axis 22 by pitch change controls 154 to vary the pitch of helicopter blades 36 collectively. The outer surface 180 of inner race 176 is spherical about point 182 on axis 22 and matingly engages the inner spherical surfaces 184 of outer race 186. Outer race 186 is a split bearing comprising ring sections 188 and 192, which are positioned within bearing retainer 194 with spring member 196, which may be a wave washer or coil spring or equivalent. Spring member 196 serves to bais the split rings 188 and 192 of outer race 186 toward each other and against the outer spherical surface 180 of inner race 176 so as to provide a constant fit in spherical bearing 160, thereby eliminating any play or looseness therein due to wear or tolerance build up.

It will be noted that swash plate plate assembly 150 envelop spherical bearing 160, transmission housing sleeve member 116, radial support upper bearing 42 and drive shaft 34 and includes stationary swash plate ring 200, which is connected to pitch change controls 154 through pivotal link members 202 so as to be translatable thereby along axis 22 to effect collective pitch of blades 36 and so as to be tiltable thereby with respect to axis 22 to effect cyclic pitch change of blades 36. Stationary swash plate ring 200 engages and is supported from spherical bearing 160 through bearing retainer 194 which it engages with the assistance of retainer ring mechanism 204. Ring bearings 206 and 208 support rotating swash plate ring 210 from stationary swash plate 200 so that the rotating swash plate 210 may rotate with rotor 20.

It is an important teaching of this invention that the height of rotor mast 24 be reduced without increasing the width thereof by positioning swash plate assembly 150 outboard of sleeve section 116 of the transmission housing 44 rather than supporting the swash plate from a standpipe member which extends upwardly from the transmission housing as shown in the prior art Patent 3,322,200. It is important to note that this reduction in rotor height has been accomplished without increasing rotor width since the geometry of the swash plate assembly 150 is determined by the location of the power servos of pitch change controls 154 which introduce signals to the swash plate assembly and by the position of the pitch horns 140 which receive signals from the swash plate 150. The servos are normally connected to and supported from gear box or transmission housing 44 as a matter of convenience, and it will be noted that this construction permits the servos to continue to be supported from housing 44 since the housing is considerably wider than the swash plate so that the swash plate width need not and has not been increased.

It is important to note that in the prior art construction shown in U.S. Patent No. 3,322,200, wherein the swash plate spherical bearing is supported from the rotor drive shaft so as to avoid bearing play by keeping the bearing to a minimum diameter, a substantial and otherwise nonfunctional web section extends between the spherical bearing and the swash plate to support the swash plate in alignment with the pitch change horns and the input control signals thereto. In this construction, the substantial radially extending web section has been eliminated in that transmission housing 44 performs the swash plate supporting function so that the swash plate radial dimension with respect to axis 22 has not been increased while the rotor height has been decreased, thereby saving substantial weight. The reduced length of the shaft 34 above bearing 42 also reduces the deflections of the rotor head 20 and its blades 36, more than compensating for the increased shaft deflection due to the use or higher strength-to-weight ratio materials, such as titanium, for shaft 34.

I wish it to be understood that I do not desire to be limited to the exact details of construction shown and described, for obvious modifications will occur to a person skilled in the art.

We claim:

1. A helicopter rotor mast system adapted to connect a helicopter rotor to a helicopter rotor drive system and including:
    (a) a drive shaft of circular cross section and concentric about the rotor axis of rotation,
    (b) a sleeve member of circular cross section and concentrically enveloping said drive shaft to define an annular chamber therebetween,
    (c) a bearing system located in said annular chamber and connecting said drive shaft to said sleeve member so as to support said drive shaft for rotation within said sleeve member,
    (d) a swash plate mechanism of generally circular cross section concentrically enveloping said shaft, bearing and sleeve member and including:
        (1) a stationary ring member and,
        (2) a rotatable ring member supported for rotation therefrom,
    (e) a ring shape spherical bearing snugly enveloping said sleeve member and positioned between said sleeve member, and said swash plate mechanism and engaging said swash plate mechanism to support said swash plate mechanism for angular motion with respect to said drive shaft.

2. Apparatus according to claim 1 wherein said bearing system includes a self-aligning bearing adapted to accommodate slope deflection and provide alignment of said drive shaft with respect to said rotor axis of rotation.

3. Apparatus according to claim 1 and including a selectively contoured ring member bonded to the exterior of said drive shaft and engaging said bearing system to provide a positive support connection between said drive shaft and said bearing system.

4. Apparatus according to claim 1 and wherein said spherical bearing includes:
  (a) an inner ring race member concentrically enveloping said sleeve and having a spherical outer surface,
  (b) an outer ring race member comprising a plurality of split bearing rings having inner surfaces defining a spherical surface engaging the spherical surface of said first race member in mating relation and,
  (c) spring means urging said split bearing rings of said outer race member toward one another and toward said inner race member to take up any play caused by wear or tolerance build-up between the inner and outer race members.

5. Apparatus according to claim 4 and including a substantially cylindrical standpipe member enveloping said sleeve member and supported therefrom and engaging said swash plate mechanism to provide radial support for said swash plate mechanism while permitting relative axial movement therebetween.

6. Apparatus according to claim 2, wherein said drive shaft is made of titanium.

7. A helicopter rotor mast system adapted to connect a helicopter rotor to a helicopter rotor drive system and including:
  (a) a drive shaft of circular cross section and concentric about the rotor axis of rotation,
  (b) a sleeve member of circular cross section and concentrically enveloping said drive shaft to define an annular chamber therebetween,
  (c) a bearing system located in said annular chamber and connecting said drive shaft to said sleeve member so as to support said drive shaft for rotation within said sleeve member, and wherein said bearing system includes a self-aligning bearing adapted to accommodate slope deflection and misalignment of said drive shaft with respect to said rotor axis of rotation,
  (d) a swash plate mechanism of generally circular cross section concentrically enveloping said shaft, bearing and sleeve and including:
    (1) a stationary ring member, and,
    (2) a rotatable ring member supported for rotation therefrom,
  (e) a ring shape spherical bearing snugly enveloping said sleeve member and positioned between said sleeve member and said swash plate mechanism and engaging said swash plate mechanism to support said swash plate mechanism for angular motion with respect to said drive shaft, and wherein said spherical bearing includes:
    (1) an inner ring race member concentrically enveloping said sleeve and having a spherical outer surface,
    (2) an outer ring race member comprising a plurality of split bearing rings having inner surfaces defining a spherical surface engaging the spherical surface of said first race member in mating relation, and
    (3) spring means urging said split bearing rings of said outer race member toward one another and toward said inner race member to take up any play caused by wear or tolerance build-up between the inner and outer race members,
  (f) a selectively contoured ring member bonded to the exterior of said drive shaft and engaging said bearing system to provide a positive support connection between said drive shaft and said bearing system,
  (g) and a substantially cylindrical standpipe member enveloping said sleeve member and supported therefrom and having a cylindrical outer surface sized to engage the inner cylindrical surface of said inner race member of said spherical bearing so as to permit motion of the spherical bearing and the swash plate mechanism along said standpipe member in the direction of the rotor axis of rotation.

8. A helicopter rotor including:
  (a) a hub member of circular cross section positioned concentrically about the rotor axis of rotation,
  (b) a plurality of helicopter blades projecting radially from said hub and connected thereto for rotation therewith about said axis of rotation and for rotation with respect thereto about a feathering axis,
  (c) a rotor drive system including a transmission mechanism positioned concentrically about said axis of rotation,
  (d) a housing enveloping said transmission and including a sleeve member projecting therefrom and positioned concentrically about said axis of rotation,
  (e) a rotor drive shaft connecting said transmission to said hub so that said rotor will be driven through said transmission and being of circular cross section and concentric about said axis of rotation and enveloped within said sleeve member of said housing to form an annular chamber therebetween,
  (f) a ring-shape bearing mechanism located in said annular chamber and engaging said drive shaft and said sleeve member to support said drive shaft from said sleeve member for rotation about said axis of rotation therewithin,
  (g) a swash plate mechanism of generally circular cross section concentrically enveloping said shaft, bearing and sleeve member and including a stationary ring member and a rotatable ring member supported for rotation therefrom,
  (h) a ring-shape spherical bearing snugly enveloping said sleeve member and positioned between said sleeve member and said swash plate mechanism and engaging said swash plate mechanism to support said swash plate mechanism for angular motion with respect to said drive shaft,
  (i) control means connected to said swash plate mechanism to cause said swash plate mechanism to move with respect to said drive shaft and said axis of rotation,
  (j) means connecting said swash plate mechanism to said blades so that swash plate motion causes pitch change movement of said blades.

9. Apparatus according to claim 8 and wherein said spherical bearing includes:
  (a) an inner ring race member concentrically enveloping said sleeve and having a spherical outer surface,
  (b) an outer ring race member comprising a plurality of split bearing rings having inner surfaces defining a spherical surface engaging the spherical surface of said first race member in mating relation, and
  (c) spring means urging said split bearing rings of said outer race member toward one another and toward said inner race member to take up any gap caused by wear or tolerance between the inner and outer race members.

10. Apparatus according to claim 8 and including a substantially cylindrical standpipe member enveloping said sleeve member and supported therefrom and engaging the inner surface of the inner race of said spherical bearing in mating relation to support said spherical bearing and so as to permit motion of the spherical bearing and the swash plate mechanism along said standpipe member in the direction of the rotor axis of rotation.

11. A helicopter rotor including:
(a) a hub member of circular cross section positioned concentrically about the rotor axis of rotation,
(b) a plurality of helicopter blades projecting radially from said hub and connected thereto for rotation therewith about said axis of rotation and for rotation with respect thereto about a feathering axis,
(c) a rotor drive system including a transmission mechanism positioned concentrically about said axis of rotation,
(d) a housing enveloping said transmission and including a sleeve member projecting therefrom and positioned concentrically about said axis of rotation,
(e) a rotor drive shaft connecting said transmission to said hub so that said rotor will be driven through said transmission and being of circular cross section and concentric about said axis of rotation and enveloped within said sleeve member of said housing to form an annular chamber therebetween,
(f) a ring-shape bearing mechanism located in said annular chamber and engaging said drive shaft and said sleeve member to support said drive shaft from said sleeve member for rotation about said axis of rotation therewithin and wherein said bearing mechanism includes a self-aligning bearing adapted to accommodate slope deflection and provide alignment of said drive shaft with respect to said rotor axis of rotation,
(g) a swash plate mechanism of generally circular cross section concentrically enveloping said shaft, bearing and sleeve member and including a stationary ring member and a rotatable ring member supported for rotation therefrom,
(h) a ring shape spherical bearing snugly enveloping said sleeve member and positioned between said sleeve member and said swash plate mechanism and engaging said swash plate mechanism to support said swash plate mechanism for angular motion with respect to said drive shaft, and wherein said spherical bearing includes:
  (1) an inner ring race member concentrically enveloping said sleeve and having a spherical outer surface,
  (2) an outer ring race member comprising a plurality of bearing rings having inner surfaces defining a spherical surface engaging the spherical surface of said first race member in mating relation and,
  (3) spring means urging said bearing rings of said outer race member toward one another and toward said inner race member to take up any gap caused by wear or tolerance between the inner and outer race members,
(i) control means connected to said swash plate mechanism to cause said swash plate mechanism to move with respect to said drive shaft and said axis of rotation,
(j) means connecting said swash plate mechanism to said blades so that swash plate motion causes pitch change movement of said blades,
(k) a selectively contoured ring member bonded to the exterior of said drive shaft and engaging said bearing to provide a positive support connection between said drive shaft and said bearing,
(l) and a substantially cylindrical standpipe member enveloping said sleeve member and supported therefrom and having a cylindrical outer surface sized to engage the cylindrical inner surface of said inner race member in mating relation so as to permit motion of the spherical bearing and the swash plate mechanism along said standpipe member in the direction of the rotor axis of rotation.

12. A helicopter rotor system including:
(a) a rotor drive shaft concentric about the rotor axis of rotation,
(b) a transmission drive system connected to drive said drive shaft in rotary motion,
(c) a transmission housing enveloping said transmission drive system and including a sleeve member of circular cross section enveloping said shaft and spaced therefrom to define an annular chamber and between,
(d) bearing means positioned in said annular chamber to support said shaft for rotation within said sleeve member,
(e) and a swash plate member enveloping and supported from said sleeve member and in substantial radial alignment with respect to axis rotation with said bearing means and said sleeve member.

References Cited

UNITED STATES PATENTS

| | | |
|---|---|---|
| 3,188,884 | 6/1965 | Bancroft. |
| 3,255,825 | 6/1966 | Mouille et al. _____ 170—135.75 |
| 3,309,936 | 3/1967 | Gaubis _____ 170—135.75 X |
| 3,322,200 | 5/1967 | Tresch _____ 170—135.75 X |

EVERETTE A. POWELL, JR., Primary Examiner

U.S. Cl. X.R.

416—134, 174